J. ZIMMERMAN.
Lifting Jack.
No. 35,646.
Patented June 17, 1862.
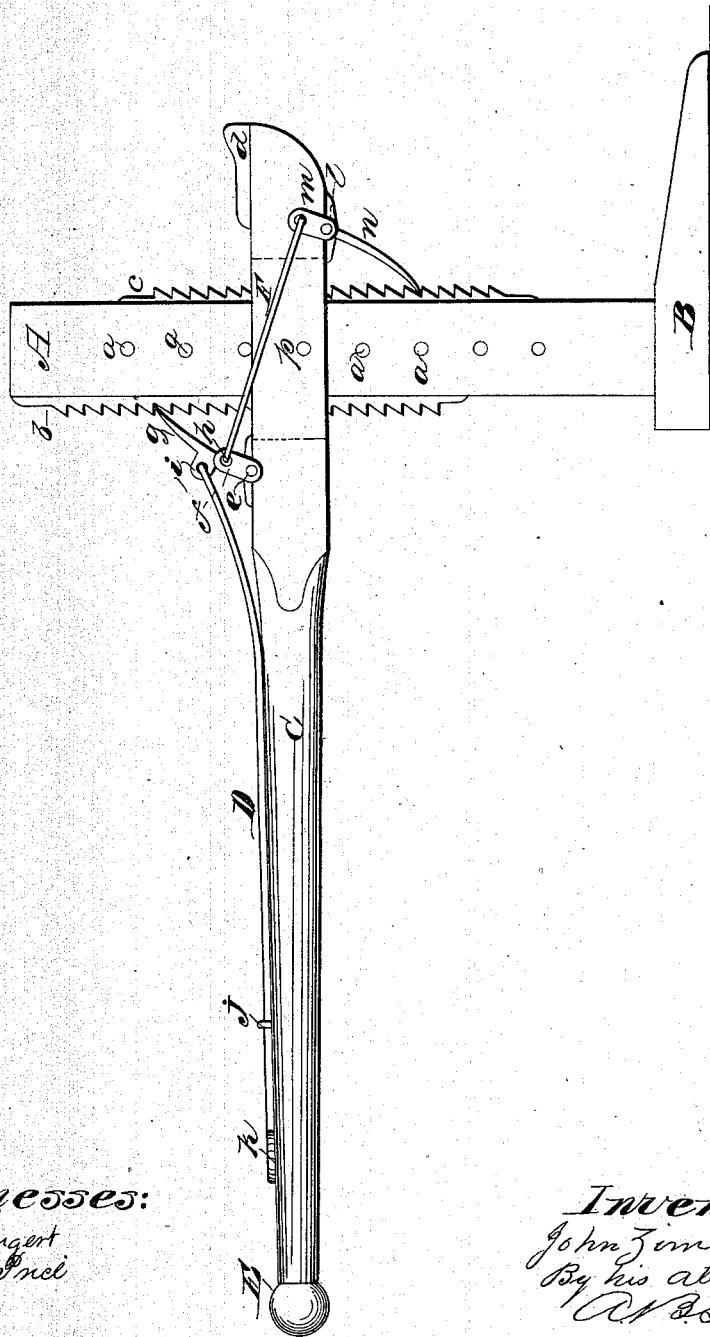

UNITED STATES PATENT OFFICE.

JOHN ZIMMERMAN, OF BLOOMFIELD, PENNSYLVANIA.

IMPROVEMENT IN LIFTING-JACKS.

Specification forming part of Letters Patent No. 35,646, dated June 17, 1862.

*To all whom it may concern:*

Be it known that I, JOHN ZIMMERMAN, of Bloomfield, in the county of Perry and State of Pennsylvania, have invented certain new and useful Improvements in Lifting-Jacks; and I do hereby declare that the following is as full, clear, and exact a description of the construction and operation of the same as I can now give, reference being had to the annexed drawing, making a part of this specification.

The nature of my invention consists in the employment of two dogs arranged on opposite sides of the standard and operating the same by means of a connecting-rod and a sliding rod reaching along the working-lever near to the hand of the operator.

To enable others skilled in the art to make and use my invention, I will proceed to describe its construction and operation.

A standard, A, rises from the foot B, provided with a series of holes, $a$. On each side of the standard are bolted or otherwise secured the racks $b\ c$, having reverse teeth, as represented in the drawing. The working-lever C is mortised to receive the standard A, and is provided with a metallic bearing-piece, $d$, in the usual manner. On the top of this lever, and in front of the rack $b$, is secured the rock-shaft $e$, with which are cast or otherwise made the crank $f$ and the dog $g$. The outer end of this crank is made with an eye, $h$, and the dog with a perforated ear, $i$, into which latter is hooked the operating-rod D, which extends along on the top of the lever C, through staples $j$, to near the handle E thereof, where it is provided with a loop, $k$. To the under side of the lever C, and in front of the rack $c$, is the rock-shaft $l$, provided with the crank $m$ and dog $n$, which are made in all respects like their corresponding parts, $f$ and $g$, except that the dog $n$ has no perforated ear. The cranks $f$ and $m$ being connected by means of the rod F, it will be seen that the operation of this machine is as follows:

The lever C being adjusted to the proper elevation by means of the pin $p$ and the dogs $g$ and $n$ being out of contact with the racks $b$ and $c$, the bearing-piece $d$ is adjusted under the object to be lifted. The working-lever C is then depressed, and when the object is raised high enough the operating-rod D is shoved toward the standard A, which throws both dogs $g$ and $n$ into contact with the teeth of the racks $b$ and $c$, and there the lever C is firmly held. When it is desired to lower the object, the operator slightly depresses the lever C with one hand at E and with the other draws toward him the rod D, which disengages the dogs and racks, when the handle of the lever is free to rise.

I am aware that a lifting-jack has been devised wherein one rack and one dog are used, the latter being operated by a lever working through a slot or mortise therein; but in that case, the whole power of the machine being dependent upon a single set of teeth, is not adapted to the raising of heavy weights, because these teeth soon become stripped, or, if these are very heavy and strong, the dog is liable to break, when the machine becomes wholly useless until repaired. Moreover, the whole weight is thrown upon one side of the standard, which tends to tip the machine onto the toe of its foot, either throwing the object to the ground or breaking the machine. In addition to this, the dog is partly worked by gravity, and therefore may, either from rust or other obstructing cause, cease to work at all. In all these particulars my machine materially differs, as will readily be perceived. The weight is thrown equally upon each side of the standard, and thus is its perpendicularity maintained. The two dogs and racks share the work, and if one is broken the others are still capable of use until opportunity arrives for repairing.

Having thus described my invention and the manner in which it operates, what I claim therein as new, and desire to secure by Letters Patent of the United States, is—

1. The two racks $b$ and $c$, in combination with the two dogs $g$ and $n$, when arranged one on each side of the standard A and operating substantially as described.

2. The combination of the two racks $b$ and $c$, the two dogs $g$ and $n$, the connecting-rod F, and the operating-rod D, as and for the purposes set forth.

JOHN ZIMMERMAN.

Witnesses:
JOHN R. SHULER,
H. CAMPBELL.